March 8, 1966   E. N. COLE, JR., ETAL   3,239,059
TEST AND TRANSFER MECHANISM
Filed May 2, 1963   2 Sheets-Sheet 1

INVENTORS
Everett N. Cole, Jr. & Ellsworth P. Andrews
BY
Ezekiel Wolf, Wolf & Greenfield
ATTORNEYS March 8, 1966 E. N. COLE, JR., ETAL 3,239,059
TEST AND TRANSFER MECHANISM
Filed May 2, 1963 2 Sheets-Sheet 2
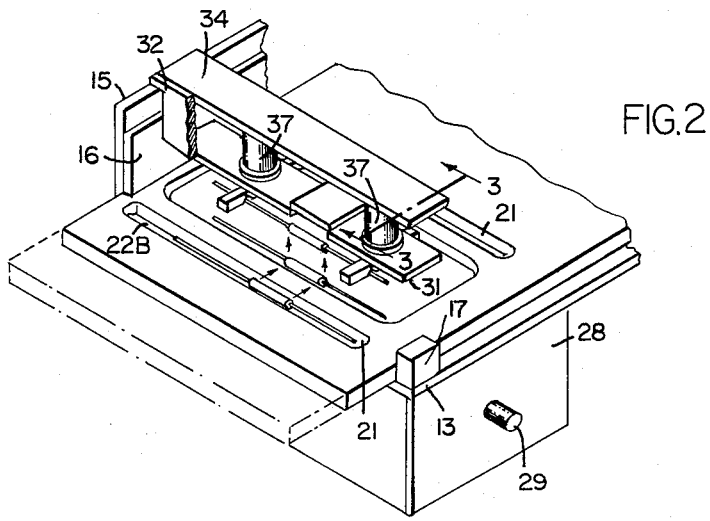
FIG.2
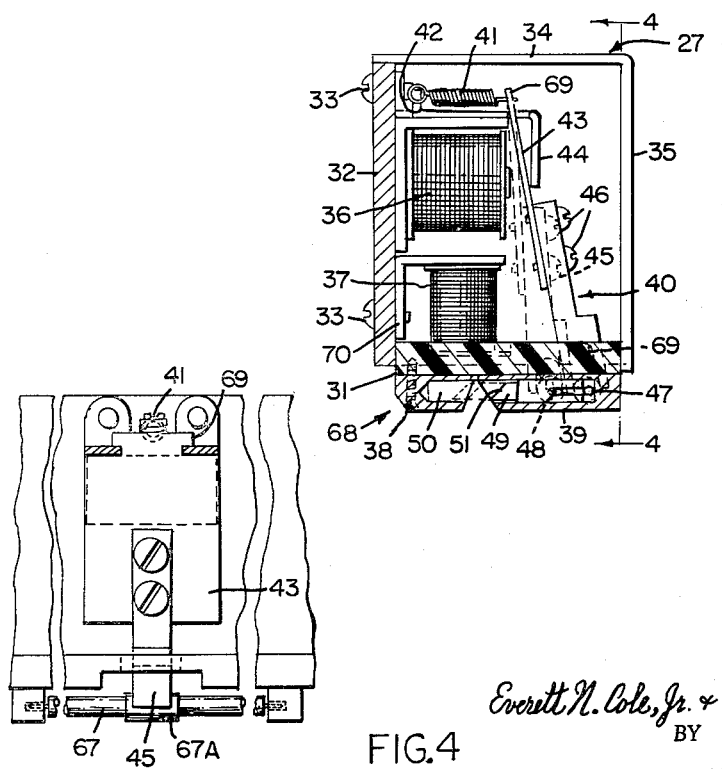
FIG.3
FIG.4
INVENTORS
Everett N. Cole, Jr. & Ellsworth P. Andrews
BY
Ezekiel Wolf, Wolf + Greenfield
ATTORNEYS United States Patent Office 3,239,059
Patented Mar. 8, 1966

3,239,059
TEST AND TRANSFER MECHANISM
Everett N. Cole, Jr., Tewksbury, and Ellsworth P. Andrews, Belmont, Mass., assignors to Transitron Electronics Corporation, Wakefield, Mass., a corporation of Delaware
Filed May 2, 1963, Ser. No. 277,608
10 Claims. (Cl. 209—73)

The present invention relates to the automatic handling, transfer and testing of components. More particularly the present invention relates to an apparatus for automatic feeding for acceptance or rejection of an electrical component at any one of a pluralities of associated testing stations.

Due to the increased demands of modern technology, electrical devices such as diodes, resistors, etc., must be rigorously inspected after manufacture to insure accuracy and reliability. Often the testing procedure is highly complex and involves a multitude of individual tests which substantially add to the cost of electrical components. For example, in the case of diodes, frequently as many as six tests are performed before a manufacturer will guarantee his product for use. Commonly, this plurality of tests is performed at individual testing stations where it is necessary to manually, or by the use of complex machinery, transfer a device to be tested from one testing station to subsequent testing stations. The handling and transferring of electrical components from one testing station to another is complicated by the fact that many of these components are extremely small in size and difficult to properly orient and engage in releasable electrical contact.

Accordingly it is an object of the present invention to provide a novel, automatic transfer and testing apparatus which is free from complexity, yet highly accurate and reliable.

It is another object of this invention to provide an apparatus in accordance with the preceding object which is extremely inexpensive to manufacture and may be adapted to perform a multitude of varying tests making the apparatus highly versatile in use.

It is another object of this invention to provide an apparatus in accordance with preceding objects which can be used as a modular unit in connection with other similar apparatus allowing rapid changes in testing procedures and test equipment used.

It is still another object of this invention to provide an apparatus in accordance with the preceding objects which is highly compact yet affords extremely high processing rates and efficiency, allowing large savings in time and materials.

It is a still further object of this invention to provide an apparatus in accordance with the preceding objects which can individually separate electrical components rejected at a particular station while advancing such components which pass the test to a sequentially arranged testing station, or to a collection zone.

The apparatus of this invention has a supporting frame carrying a reciprocally slideable, horizontal transfer plate. The transfer plate has a series of aligned, alternate device holders and component reject portions. A series of test stations are located above the horizontal transfer plate at predetermined, substantially horizontally aligned positions. Preferably the testing stations carry attracting means adapted to remove a component from a component holder allowing the component to be tested and subsequently repositon the component in another component holder or alternatively in a reject portion if the device does not pass the test performed.

The test stations are spaced apart a distance equal to the spacing between successive holders of the transfer plate. Preferably the transfer plate is linked to a reciprocating drive which slides the plate in a plane so that each holder is underlying a test station at one extreme of movement while underlying a second test station at a second extreme of linear motion. Thus, components can be individually fed to components holders and advanced from one test station to another. A plurality of components can be tested simultaneously and advanced simultaneously or alternatively if one or more components being tested should prove defective, these components may be rejected without impeding the advancement of perfect components. There are few moving parts in the apparatus thus preventing or alleviating problems of frictional wear and mechanical malfunction normally present in apparatus performing multiple functions. Preferably, reject bins are located beneath each of the reject portions to collect components rejected at any particular station. Since individual bins may be employed below each station, it is possible to determine the particular test that any specific component has failed to pass.

In the preferred method of this invention, a component is located on a first device holder of the transfer plate, moved to a position underlying the test station, raised from the position to the test station, lowered or returned to a second holder of the transfer plate and again advanced in the same plane as the plane of the original advancement. If the component is found to be defective it is discarded or rejected from the apparatus through the reject portion rather than being again lowered to the transfer plate. Normally a plurality of planar advancement, raising and return movements are given to the component until it is fully tested and allowed to pass out of the apparatus of this invention. Due to the fact that a plurality of components can be tested, simultaneously one at each station, high testing rates can be maintained.

Other features, objects and advantages of the invention will be better understood and appreciated from the following detailed description of one embodiment thereof selected for purposes of illustration and shown in the accompanying drawing in which:

FIG. 2 is a perspective view of a single testing station and associated elements thereof;

FIG. 3 is a cross-sectional view of a testing and transfer station thereof showing a preferred gripping mechanism along line 3—3 of FIG. 2 and, FIG. 4 is a view taken through line 4—4 of FIG. 3.

Figure 1:
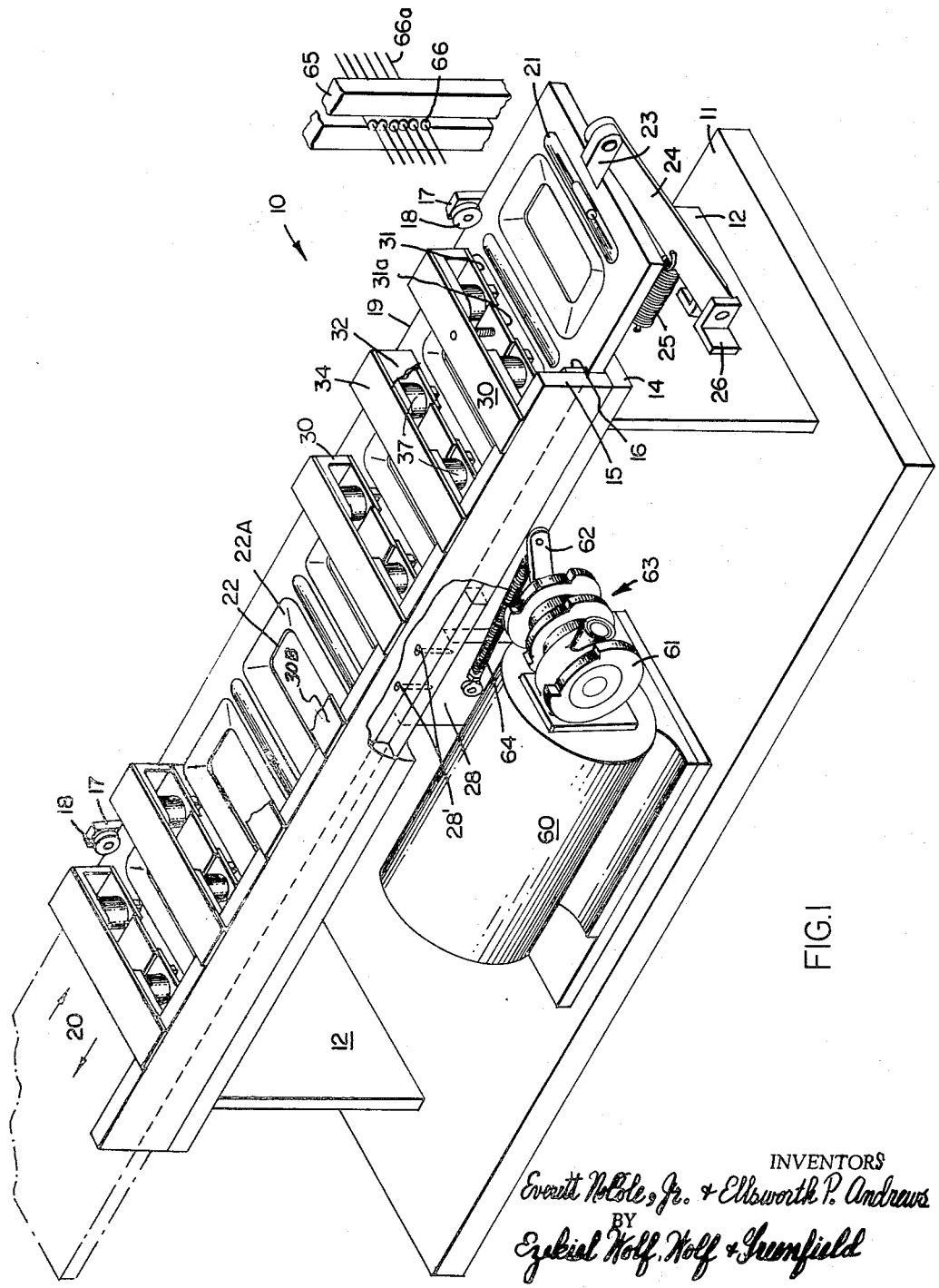
FIG. 1 is a perspective view of a preferred embodiment of an apparatus constructed in accordance with this invention.

With reference now to the drawing and particularly FIGS. 1 and 2, an apparatus 10 of this invention is shown having a supporting frame comprising a horizontal, rectangular base 11 and two vertically extending rectangular, parallel walls 12. Guide rails 13 and 14 are mounted in a horizontal positon on edges of the vertically extending walls 12. A rectangular, vertically extending backing plate 15 is affixed to guide rail 14 on one side of the machine. A transfer plate 19 is slideably horizontally mounted on the guide rails 13 and 14 by means of a locking plate 16 and freely rotatable rollers 18 mounted on supports 17 which are affixed to an outer side edge of guide rail 13.

The transfer plate 19 is preferably a flat, planar, non-metallic plate having electrical device holders 21 alternating with component reject portions 22. Preferably the device holders are pockets or elongated recesses formed in the upper surface of plate 19 adapted to carry electrical components. The reject portions 22 preferably comprise cutout portions in the plate which extend completely through the plate from the top surface to the lower surface, allowing rejected imperfect components to drop into underlying reject bins 28. In the preferred form of the invention, there is one reject bin 28 provided for each cutout 22. These reject bins 28 have handles 29 thereon and rest directly on the base plate 11 enabling them to be slid out of and removed from the machine periodically as desired.

Preferably both the reject cutouts 22 and the holders 21 are bevelled inwardly as shown at 22A and 22B to allow components dropped in outer edges thereof to slide inwardly towards the center portions. The particular shape, form, dimensions and type of holders and reject portion may be varied to suit the particular electrical device being tested in the apparatus. In the preferred embodiment, eight holders 21 and seven reject portions 22 are provided. The holders 21 are spaced 3 inches apart as are the test stations with the plane of the transfer plate being approximately 1 inch below the plane of the test stations. However, the particular number of test stations, holders and reject portions as well as their spacing may vary.

A plurality of test stations 27 are arranged in series above the transfer plate 19 and are secured to the backing plate 15 of the apparatus. In the preferred embodiment seven test stations 27 are used. These test stations are suitably wired to permit individual tests to be performed at each station, such as, open-shut polarity check, inverse current test, pulse recovery test, forward voltage at varying magnitudes, etc. The particular number of test stations may be varied as desired.

Preferably each test station 27 comprises a housing having an insulating base plate 31, as best shown in FIGS. 3 and 4, vertical side plates 32 and 35, an end plate 30 and a horizontal top or mounting plate 34 affixed to the backing plate 15 at one end thereof. Base plate 31 is indented at 31A to allow clearance of the body of a device when leads of the device are retained in contact clips 68. The plates forming the walls or casing for the test station may be affixed to each other by conventional means such as screws, bolts, clips etc. In some cases the casing may be entirely eliminated or other shaped or dimension casings may be used.

Pairs of parallel lead or contact clips 68 are mounted in spaced relation on the bottom of each base plate 31. Each lead clip 68 comprises a conductive first element 38 and an aligned conductive second element 39. Each test clip is electrically connected by suitable wiring (not shown) to electrical testing devices (not shown) preferably mounted on a separate housing in a nearby location. The elements 38 and 39 have an axially aligned bore 50 extending partially through each element as shown in FIG. 3 and adapted to slideably receive a cylindrical dog 49. The cylindrical dog 49 forms part of a gripping means 40 as will be described. A V-shaped notch is formed by facing ends of elements 38 and 39 adapted to receive a lead 66A of an element to be tested. The forward end of the dog 49 is angled upwardly as shown in FIG. 3 so that the dog 49 can be slid into dotted position shown in FIG. 3 firmly pushing the lead 66A into good electrical contact with the elements 38 and 39. The rear end of the dog 49 is provided with a hole adapted to receive a pin 48 of a gripping means cross rod 67 which extends between each pair of lead or test clips of each test station 27. Suitable horizontally extending notches 47 are provided in sides of element 39 to guide the cross rod 67 in actuating the dog 49 to its forward position as shown in the dotted outline or to its resting position as shown in full lines in FIG. 3.

The actuating portion of the gripping means 40 comprises a yoke 45 having a transverse notch 69 at one end adapted to slideably engage an enlarged cylindrical portion 67A of the cross rod 67. An end of the yoke 45 is affixed to a ferrous metal plate by means of screws 46. The ferrous metal plate 43 acts in conjunction with yoke 45 to form a lever arm and has a T-shaped upper tab 69 which engages a fixed angle bracket 44 mounted on a mounting bracket 42 affixed to the side plate 32. A spring 41 is also affixed to a portion of the T-shaped tab 69 at one end and to a portion of bracket 42. The spring 41 acts to continuously bias the yoke and consequently the dog 49 into an outermost position as shown in solid lines in FIG. 3. Preferably an electromagnet 36 is secured to the side plate 32 and is adapted to be actuated after the diode 66 is attracted to the V-shaped notch. Upon actuation, the electromagnet 36 pivots the plate 43 about a pivot point on bracket 44 and pulls the gripping means 40 into the position shown in dotted lines in FIG. 3 insuring good electrical and mechanical contact of the lead to the lead clips.

Preferably the means for attracting the leads 66A into the V-shaped notches of the lead clips comprise electromagnets 37 provided on an angle bracket 70 affixed to the side plate 32. Upon actuation of the electromagnets 37, preferably slightly before actuation of the electromagnet 36, diodes 66 are attracted to the V-shaped groove and removed from the transfer plate, thus, the electromagnets 37 and the gripping means 40 act as a transfer means to raise and hold the diodes or other electrical devices.

It is preferred that the test clip elements 38 and 39 as well as dog 49 be of a substantially non-magnetic material such as stainless steel or nickel alloys. This feature enables the electromagnets 37, which are substantially vertically aligned with the V-shaped notches, to direct the leads of the diode directly into the V-shaped notches since the clips and dog do not distribute the magnetic field created by the electromagnets.

A reciprocating or oscillating drive 63 (FIG. 1) is connected to the transfer plate 19 preferably by means of a connection block 28 which is affixed to the transfer plate by screws 28' and extends in a vertical direction towards the base 11. A linkage arm 64 is pivotally attached to the connection block 28 at a first end and pivotally attached to a second linkage arm 62 at a second end. The linkage arm 62 is capable of rotating a full 360° causing alternate forward and reverse directional movement of the transfer plate 19. The base of the linkage arm 62 is suitably connected through a conventional gear arrangement to a drive motor 60 which actuates the motion of linkage arm 62. Also connected to the reciprocating drive motor 60 is a series of cams 61. The cams 61 are used to actuate electrical connections to the electromagnets 36 and 37 as well as conventional testing apparatus attached to each of the test stations.

The forward end of the machine may be fed manually or a conventional feeding device of the type partially illustrated at 65 may be used. The automatic feed 65 is of conventional nature comprising 2 guide rails holding an upwardly extending stack of diodes 66. A control arm 24 is pivotally attached to vertical support 12 by brackets 26 and spring biased towards the forward end of the machine by fixedly attached spring 25 extending between an intermediate portion of the arm 24 and the support 12. A dog 23 extends towards the apparatus 10 at an acute angle from the control arm 24. In the operation of the machine, when the transfer plate moves forwards, the control arm 24 is urged in the same direction allowing the dog 23 to release a single diode from the automatic feed 65 which is positioned so as to allow the released diode to drop into the first holder 21 of the transfer plate. Reciprocation of the transfer plate in the rearward direction allows the control arm to be pulled rearwardly by the spring 25 thus closing the automatic feed mechanism.

In the operation of this apparatus, the drive motor 60 is actuated causing the transfer plate to reciprocate in a plane in the direction of the arrows shown at 20 in FIG. 1. The device holders 21 are spaced apart a distance equal to the distance between the V-shaped notches of adjoining test stations. Preferably the spacing between each of the test stations and holders are identical through the machine. When the transfer plate reaches its forward extreme of movement a diode 66 having axially aligned, outwardly extending, ferrous metal containing leads 66A, is dropped into the first holder 21. Upon movement of the transfer plate to its rearmost position, the first diode is picked up by the first test station 27 upon actuation of electromagnets 37 and subsequently gripped by actuation of electromagnet 36. The test is then performed as the transfer plate is moving forward to its starting position. The machine is so timed that the test at each station is completed while the transfer plate presents a reject portion 22 directly below each test station. If the diode 66 tested at the first test station fails to meet the test, it is released by de-actuation of the electromagnets 37 and 36 allowing the diode to drop to a reject bin 28 through a reject portion 22. If the diode passes the test at the first test station it is retained by the electromagnets until transfer plate 19 has returned to its original starting position whereupon the second in the series of holders 21 directly underlies the V-shaped notch of the lead clips. At this point, the electromagnets 36 and 37 are deactuated and the diode 66 drops into the second holder 21. This sequence of steps is continuously repeated. Thus, assuming a series of diodes pass the test at the respective test stations 27, each of the holders 21 may be filled with a diode at any one period of time and each of the test stations may act simultaneously to pick up and test a diode. In other cases, where one or more of the diodes are found to be defective at one or more test stations, only the remaining test stations will actually be working during any cycle of the transfer plate. In the preferred form of the invention the extreme rear test station 27, as shown in FIG. 1 at the extreme left, is employed as a removal means for perfect diodes which have passed all of the previous tests. This test station picks up diodes and automatically drops them into a reject bin 28 during the normal cycling of the machine as above described. Thus the last in the series of reject bins 28 is filled with components which have passed all of the tests.

Many variations of the apparatus in this invention are possible. For example, the number of test stations and corresponding number of holders and reject portions may be multiplied or minimized as desired. A second apparatus similar to the apparatus 10 described may be aligned with the apparatus 10 and the transfer plates integrally attached whereby each apparatus acts as a modular unit and a single drive motor can be used to actuate transfer plates of two similar apparatus. The particular design of the test station may be varied and in some instances it is found that the gripping means and associated electromagnet 36 may be eliminated thus simplifying the test station construction (this structure is substantially similar to that shown in FIGS. 1 and 2 where the electromagnet and gripping means are not shown in order to simplify the drawings). It is also possible to use an air blast means beneath the holders 21 and/or vacuum ports above the test clips in place of electromagnets 37 to remove the diodes or electrical devices from the transfer plate and carry them to the test clips. This construction may be rendered necessary when non-magnetic lead materials are used in the electrical devices to be tested. The support frame of the apparatus may also be varied as desired.

It is evident that those skilled in the art may now make numerous modifications of and departures from the specific embodiment of the invention described herein without departing from the inventive concepts. Therefore the breadth of this invention is to be construed as limited only by the spirit and scope of the appended claims.

What is claimed is:

1. In an apparatus for transferring and testing electrical components having axially aligned outwardly extending leads, the improvement comprising a testing and transfer station, said station having indented lead clips adapted to receive leads of said electrical components, means for attracting and retaining said leads in said indentations whereby said component may be tested, gripping means associated with said attracting and retaining means for establishing firm mechanical and electrical contact with said leads, said gripping means being mounted in said lead clips and comprising at least one elongated dog having an angled face and means for sliding said dog into said indentation causing said lead to be firmly mechanically as well as electrically contacted with said indentation.

2. An apparatus in accordance with claim 1 wherein said gripping means comprises a lever arm having a pivot point, a spring biasing said lever arm in one direction about said pivot point, means on said lever arm for actuating a cross rod linked to said dog, and motion producing means spaced from said lever arm in said station adapted to move said lever arm about its pivot point in a second direction opposed to said first direction whereby said gripping means is actuated.

3. An apparatus in accordance with claim 2 wherein said dog and said lead clips are composed of non-magnetic material.

4. An apparatus in accordance with claim 2 wherein said attracting and retaining means and said motion producing means comprise electromagnets.

5. An apparatus for transferring, testing and sorting electrical components comprising, reciprocating means for advancing said electrical components, said reciprocating means carrying first and second aligned electrical component holders and defining an opening spaced between said holders, a testing and transfer means spaced from said reciprocating means, for removing an electrical component from said first holder of said reciprocating means, testing said component and returning said component to said second holder if said component passes the test and rejecting said component through said opening in other cases, said testing and transfer means comprising spaced lead clips facing said reciprocating means, and, means in said apparatus for advancing and returning said reciprocating means into positions wherein said testing and transfer means is aligned with alternate ones of said holders.

6. An apparatus in accordance with claim 5 wherein reject collecting means are spaced below said openings between said holders.

7. An apparatus for transferring, testing and sorting electrical components comprising, a horizontally positioned transfer plate defining a plurality of component holders and reject portions arranged in series with ones of said holders alternating with ones of said reject portions, a plurality of aligned spaced apart testing and transfer means positioned above said transfer plate and aligned with said component holders and reject portions, said testing and transfer means each being spaced apart distances corresponding to the spacing of said component holders, means for advancing and returning said transfer plate with respect to said testing and transfer means so that an individual one of said holders underlies one of said testing and transfer means at one stage of movement and a second holder underlies said one testing and transfer means at a second stage of movement allowing an electrical device to be removed from said one holder and transferred to said second holder after testing whereupon said stages of movement may be repeated.

8. An automatic method of testing, transferring and sorting an electrical component having outwardly extending axially aligned electrical leads, said method comprising,
- advancing said component in a horizontal plane,
- raising said component in a vertical plane substantially perpendicular to said horizontal plane,
- testing said component,
- lowering said component to said horizontal plane through said vertical plane,
- repeating said advancing and raising procedures at spaced intervals along said horizontal plane if said component passes said testing procedure and allowing said component to fall downwardly in said vertical plane to a reject area if said component does not pass said test.

9. A method in accordance with the method of claim 8 wherein a plurality of electrical components are simultaneously tested, transferred and sorted with each component moving simultaneously in said horizontal plane and individually moving simultaneously in spaced vertical planes corresponding to said spaced intervals.

10. An apparatus for transferring, testing and sorting electrical components comprising,
- a transfer plate mounted for reciprocal sliding in a horizontal plane on a support,
- said transfer plate having a plurality of aligned, spaced electrical component carrying means alternating with a plurality of electrical component reject portions,
- a plurality of spaced testing and transfer means for removing an electrical component from one of said holder means and for repositioning said electrical component in another of said holder means or one of said reject means,
- said spaced testing and transfer means being aligned with each other and positioned above said transfer plate,
- means operatively engaging said transfer plate for reciprocating said transfer plate to cause one of said holder means to move from a position underlying one of said testing and transfer means to a position underlying a second of said testing and transfer means and then back to a position underlying said one testing and transfer means.

References Cited by the Examiner
UNITED STATES PATENTS

| | | | |
|---|---|---|---|
| 2,381,035 | 8/1945 | Campbell | 209—73 X |
| 3,009,109 | 11/1961 | Jankowsk | 209—81 X |
| 3,017,991 | 1/1962 | Chauvin | 209—88 |
| 3,032,191 | 5/1962 | Clukey | 209—81 X |

ROBERT B. REEVES, *Primary Examiner.*